United States Patent
Mukherjee (10) Patent No.: US 10,771,974 B2
(45) Date of Patent: Sep. 8, 2020

(54) METHOD AND SYSTEM FOR PREVENTING CAPTURE OF SENSITIVE INFORMATION BY PROXIMATE DEVICES

(71) Applicant: BlackBerry Limited, Waterloo (CA)

(72) Inventor: Biswaroop Mukherjee, Stittsville (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/382,010

(22) Filed: Dec. 16, 2016

(65) Prior Publication Data

US 2018/0176366 A1    Jun. 21, 2018

(51) Int. Cl.
| | |
|---|---|
| H04M 1/725 | (2006.01) |
| H04W 12/08 | (2009.01) |
| H04W 4/50 | (2018.01) |
| H04M 3/22 | (2006.01) |
| H04W 4/021 | (2018.01) |
| H04L 29/06 | (2006.01) |
| H04W 88/02 | (2009.01) |

(52) U.S. Cl.
CPC ....... *H04W 12/08* (2013.01); *H04M 1/72569* (2013.01); *H04M 1/72577* (2013.01); *H04M 3/2281* (2013.01); *H04W 4/50* (2018.02); *H04L 63/107* (2013.01); *H04L 63/108* (2013.01); *H04W 4/021* (2013.01); *H04W 88/02* (2013.01)

(58) Field of Classification Search
CPC .............................. H04W 12/08; H04W 12/02
See application file for complete search history.

(56) References Cited

U.S. PATENT DOCUMENTS

| | | | |
|---|---|---|---|
| 6,907,254 B1 * | 6/2005 | Westfield | H04W 48/04 455/404.2 |
| 7,917,159 B1 * | 3/2011 | Westfield | H04W 48/04 455/404.2 |
| 7,933,611 B2 | 4/2011 | Bocking et al. | |
| 8,494,591 B2 | 7/2013 | Bocking et al. | |
| 8,639,236 B2 | 1/2014 | Truskovsky et al. | |

(Continued)

FOREIGN PATENT DOCUMENTS

| | | |
|---|---|---|
| CA | 2600116 A1 | 3/2008 |
| CA | 2784540 A1 | 2/2013 |

(Continued)

OTHER PUBLICATIONS

European Patent Office, Extended European Search Report on Application 17204220.2-1218, dated Apr. 16, 2018.

(Continued)

*Primary Examiner* — Dung Hong
(74) *Attorney, Agent, or Firm* — Moffat & Co (57) ABSTRACT

A method for disabling one or more features at a computing device, the method including receiving, at the computing device, a first signal, the first signal directing the computing device to enter a monitoring mode; detecting, while in the monitoring mode, a second signal, the second signal indicating the computing device can operate normally; reporting to a system administrator receipt of the second signal; detecting a third signal at the computing device while in the monitoring mode, the third signal indicating an exclusion zone; responsive to the detecting of the third signal: disabling one or more features on the computing device; and reporting detection of the third signal to the system administrator.

14 Claims, 5 Drawing Sheets

(56) References Cited

U.S. PATENT DOCUMENTS

| | | | |
|---|---|---|---|
| 8,812,603 B2 | 8/2014 | O'Neill et al. | |
| 9,154,913 B2 | 10/2015 | Bocking et al. | |
| 2001/0049275 A1 | 12/2001 | Pierry et al. | |
| 2005/0007456 A1* | 1/2005 | Lee | H04M 1/72577 348/207.99 |
| 2005/0030384 A1 | 2/2005 | Lee et al. | |
| 2005/0093980 A1* | 5/2005 | Nonaka | H04N 1/00925 348/207.99 |
| 2006/0099965 A1* | 5/2006 | Aaron | H04M 3/42153 455/456.3 |
| 2006/0105758 A1 | 5/2006 | Maislos et al. | |
| 2007/0072598 A1* | 3/2007 | Coleman | H04N 21/41407 455/422.1 |
| 2007/0245026 A1 | 10/2007 | Martin et al. | |
| 2008/0224884 A1* | 9/2008 | Kennedy | H04W 48/04 340/9.1 |
| 2009/0197584 A1* | 8/2009 | Snow | H04M 1/72577 455/418 |
| 2010/0223089 A1 | 9/2010 | Godfrey et al. | |
| 2010/0304719 A1 | 12/2010 | Deep | |
| 2011/0165861 A1* | 7/2011 | Wilson | H04K 3/65 455/411 |
| 2011/0217990 A1* | 9/2011 | Tetsuhashi | H04W 4/029 455/456.1 |
| 2013/0072174 A1* | 3/2013 | Enty | H04W 4/027 455/418 |
| 2013/0295910 A1* | 11/2013 | Enty | H04W 4/50 455/419 |
| 2013/0304825 A1* | 11/2013 | O'Neill | G06Q 10/109 709/206 |
| 2015/0050922 A1* | 2/2015 | Ramalingam | H04W 12/0027 455/418 |
| 2015/0312845 A1* | 10/2015 | Teeni | G06F 21/44 455/411 |
| 2016/0286034 A1 | 9/2016 | Iyer et al. | |
| 2016/0286522 A1* | 9/2016 | Farrell | H04W 4/50 |
| 2016/0309446 A1* | 10/2016 | Katagiri | H04W 52/0219 |
| 2017/0230815 A1* | 8/2017 | Yasukawa | H04W 52/02 |

FOREIGN PATENT DOCUMENTS

| | | |
|---|---|---|
| CA | 2816045 A1 | 11/2013 |
| CN | 101242444 A | 8/2008 |
| EP | 1895750 A1 | 3/2008 |
| EP | 2557766 A1 | 2/2013 |
| EP | 2662811 A1 | 11/2013 |

OTHER PUBLICATIONS

European Patent Office, Office Action for application 17204220.2, dated Sep. 16, 2019.

European Patent Office, Office Action for Application No. 17204220.2, dated Apr. 8, 2020 (5 pages).

* cited by examiner

METHOD AND SYSTEM FOR PREVENTING CAPTURE OF SENSITIVE INFORMATION BY PROXIMATE DEVICES

FIELD OF THE DISCLOSURE

The present disclosure relates to the securing of sensitive information, and in particular relates to the securing of sensitive information from devices that are proximate to such sensitive information.

BACKGROUND

Leaks of valuable information have become a problem for companies and organizations. Such leaks may provide competitors or the public with information about upcoming produce releases, business strategy, marketing campaigns, or other similar confidential information.

For various reasons, the information may need to be shared with a limited number of people. For example, the information may be provided to participants in meetings or presentations internal to the company. In some cases, one of the participants may surreptitiously record such information. While it is difficult to prevent word of mouth leaks, the power of such leaks would be lessened if video, audio and/or photographic recordings from the meetings could be prevented.

One way to prevent such leaks is to confiscate any recording devices, including mobile telephones or other similar user equipment, once the attendee reaches the meeting. However, this is intrusive and cumbersome. Confiscation may also fail to prevent other people within the building from the secretly recording the meeting. For example, meetings may be recorded in some cases from the hallways or adjoining offices to the meeting rooms.

BRIEF DESCRIPTION OF THE DRAWINGS

The present disclosure will be better understood with reference to the drawings in which.

DETAILED DESCRIPTION

The present disclosure provides a method for disabling one or more features at a computing device, the method comprising: receiving, at the computing device, a first signal, the first signal directing the computing device to enter a monitoring mode; detecting, while in the monitoring mode, a second signal, the second signal indicating the computing device can operate normally; reporting to a system administrator receipt of the second signal; detecting a third signal at the computing device while in the monitoring mode, the third signal indicating an exclusion zone; responsive to the detecting of the third signal: disabling one or more features on the computing device; and reporting detection of the third signal to the system administrator.

The present disclosure further provides a computing device configured for disabling one or more features, the computing device comprising: a processor; and a communications subsystem, wherein the computing device is configured to: receive a first signal, the first signal directing the computing device to enter a monitoring mode; detect, while in the monitoring mode, a second signal, the second signal indicating the computing device can operate normally; report to a system administrator receipt of the second signal; detect a third signal at the computing device while in the monitoring mode, the third signal indicating an exclusion zone; responsive to the detection of the third signal: disable one or more features on the computing device; and report detection of the third signal to the system administrator.

The present disclosure further provides a computer readable medium for storing program code, which, when executed on a processor of a computing device are configured to disable one or more features on the computing device, the program code comprising instructions for: receiving, at the computing device, a first signal, the first signal directing the computing device to enter a monitoring mode; detecting, while in the monitoring mode, a second signal, the second signal indicating the computing device can operate normally; reporting to a system administrator receipt of the second signal; detecting a third signal at the computing device while in the monitoring mode, the third signal indicating an exclusion zone; responsive to the detecting of the third signal: disabling one or more features on the computing device; and reporting detection of the third signal to the system administrator.

The present disclosure further provides a system for disabling one or more features on at least one computing device, the system comprising: the at least one computing device, each computing device having a device administrator module thereon; a controlled area with a plurality of access points therein; and a system administrator module communicating with the at least one computing device and the plurality of access points, wherein the system is configured to: receive, at the system administrator module, information about the computing devices entering and exiting the controlled area; receive, at the system administrator module, a request to establish an exclusion zone within the controlled area, the exclusion zone requiring any computing device therein to disable features; causing, by the system administrator module, an exclusion zone signal to be transmitted from one or more access points or one or more of the computing devices, the exclusion zone signal indicating to computing devices within range of the exclusion zone signal to disable one or more features on such computing devices; and verifying, by the system administrator module, that computing devices within the controlled area and near the exclusion zone are secured.

The present disclosure provides methods and systems in which devices are prevented from recording sensitive information. In the embodiments described below, the example of sensitive information includes information disclosed in a meeting or presentation. However, the present disclosure is not limited to material from meetings but rather any sensitive material within a controlled environment. Thus, for example, in other embodiments products in a lab, manufacturing or testing facility may be considered sensitive material. Other examples of sensitive or confidential material are also within the scope of the present disclosure.

In accordance with one embodiment of the present disclosure, a user wants to prevent sensitive material at a talk she is giving to her colleagues from being leaked. Pictures from her previous talk were leaked online. In this regard, she does not want her colleagues to intentionally or unintentionally reveal the materials in her talk. An intentional leak may include, for example, pictures taken of her slides or video taken of her speech. An unintentional leak may include, for example, a phone call occurring within the vicinity of the meeting in which the presenter's voice can be overheard by others.

Thus, in accordance with embodiments of the present disclosure, methods and systems are provided in which sensitive information within a controlled area may be prevented from being leaked.

In one embodiment, a presenter may give her presentation in a controlled area or secure location where no devices other than corporate controlled devices are allowed. As used herein, the terms "controlled area" and "secure location" describe an area in which noncompliant devices are not permitted.

A compliant device, as used herein, comprises an electronic device on which software is installed that prevents the use of various features and functions of the device. Such software may not be altered by a user of the device, and may, for example, be controlled by the company or entity that controls the secure location. The compliant device may be any electronic device that has recording capabilities, including but not limited to any of the following, including any combination of any of the following: a cellular telephone, a mobile device, a user equipment, an endpoint, a camera, a tablet computer, a notebook computer, a laptop computer, a desktop computer, a vehicle, wearable devices including glasses or watches, among other options.

In accordance with embodiments of the present disclosure, a compliant device, on entering the controlled area, may receive a signal from a marker indicating that the device is in such controlled area. As described below, a device within the controlled area must monitor certain signals and has limits placed on the device functionality.

Further, a global system administrator module may communicate, for example using a wide area network connection, with the compliant devices to determine whether the location of any device is near sensitive material. For example, a meeting room may be considered to have sensitive information during a meeting, and may be therefore considered an "exclusion zone".

In one embodiment, the system administrator may cause the sending of a wireless signal with a non-replayable, non-repudiable, secure signature from near an exclusion zone. When such signal is detected by nearby devices, modules on these devices then shutdown one or more features on the device and report to the system administrator. For example, a microphone on a smartphone or tablet may be disabled in one case. In another example, a vehicle entering a parking garage may have a camera disabled. In a further example, eyeglasses with a camera may be completely disabled. Other options are possible.

The signal may change in time in a manner predicable by only the system administrators. For example, the signal may include a one way has, known only to the system administrator, mapping the signal to an access point X, such that (X, t, exclusion_zone_n)→S_X, where t is a time and S_X is the signal sent by transmitter X. The mapping is valid for all access points X in the system.

In this example, each access point X is sent the schedule of signals to transmit periodically, or is made aware of a subset of mapping (t, exclusion_zone_n) to derive S_X.

When a report comes in from a device to the administrator module, it will be able to assert that the signal S that was reported was current in time. This timeliness property allows the system to allow and disallow input in a timely manner. The location specificity provides a less definitive property to the system administrator to correlate the signal receipt reports from different devices, where devices that see exactly the same signals.

Once the presentation or meeting is finished, or when the devices move away from the exclusion zone, an administrator module on the devices may remove the feature restrictions.

Figure 1:
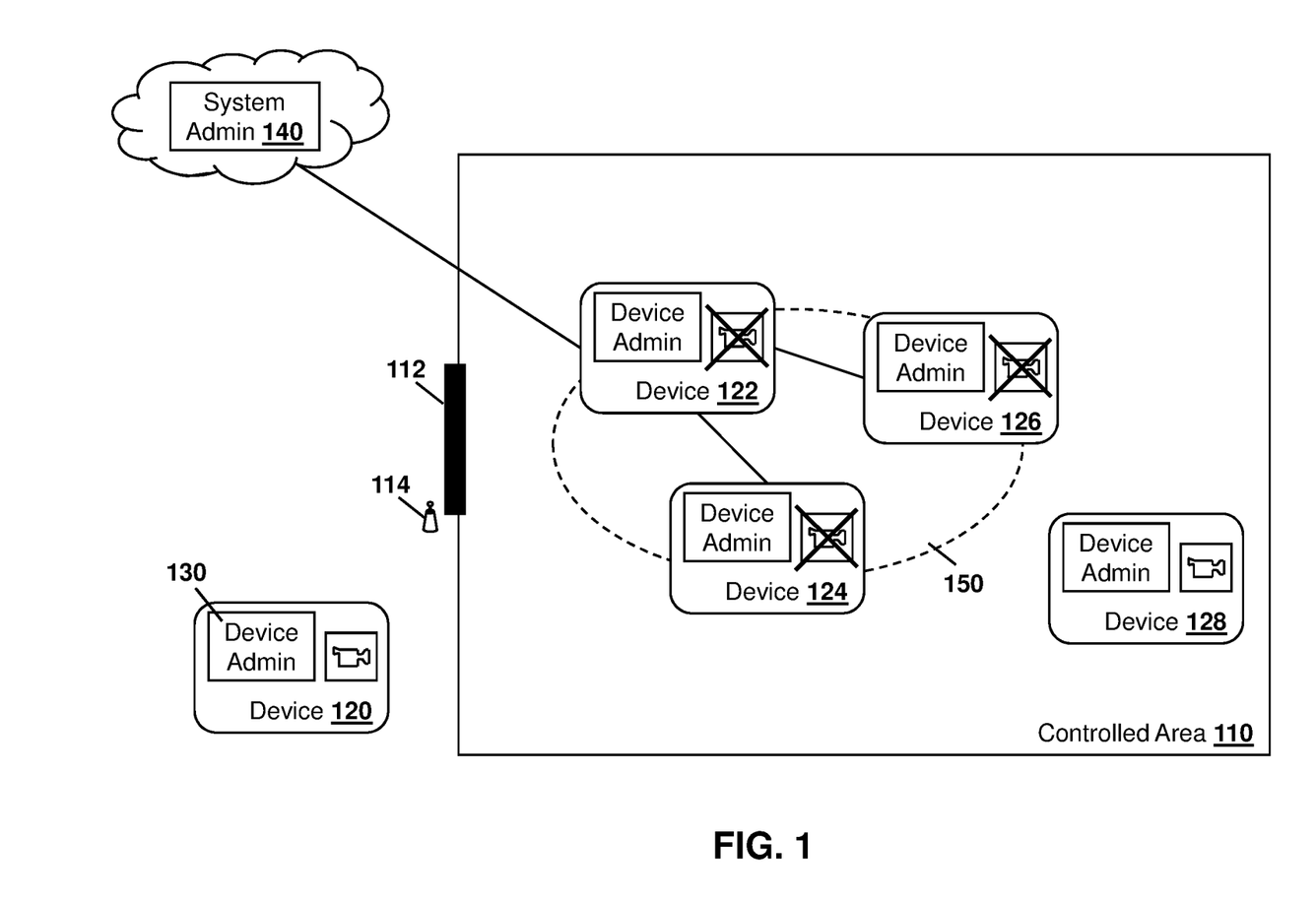
FIG. 1 is a schematic diagram of an example environment in which the systems and methods of the present disclosure may be deployed.

Reference is now made to FIG. 1, which shows a schematic diagram of an example environment in which the systems and methods of the present disclosure may be deployed.

In the embodiment of FIG. 1, a secure location or controlled area 110 is provided. For example, such controlled area 110 may be a building. However, the present disclosure is not limited to the use of a building as a secure location. In other embodiments, a controlled area may include portions or sections of a building, or may include other indoor and outdoor areas to which access may be controlled.

Controlled area 110 includes one or more entrances and/or egresses 112. It accordance with embodiments of the present disclosure, each entrance or egress 112 has a marker 114 to signal to a device that it is crossing a threshold into the controlled area 110.

Controlled area markers 114 are devices that a system administrator 140 uses to define controlled areas. The location of zone markers may have physical security properties. For example, in one embodiment markers 114 may be located adjacent security checkpoints at entrances to a building.

A plurality of user devices, shown in the embodiment of FIG. 1 as devices 120, 122, 124, 126 and 128, are present within the system. Each of devices 120-128 are compliant devices, and are the only devices that are permitted within controlled area 110. Other, non-compliant devices are prohibited from controlled area 110 and security within a building may check devices that are entering the building to ensure they are compliant.

Each of devices 120-128 has a device administrator module 130 that can communicate with a system administrator 140 and cannot be overridden by user input or other applications.

System administrator 140 is a module or node that, in one embodiment, has wide area conductivity throughout the system and can communicate with the user devices and controlled area markers 114 to set up and enforce exclusion zones, as described below.

Various exclusion zones for user devices 120 to 128 may be made within controlled area 110. An exclusion zone, as used herein, is an area in which at least some features or functions of compliant user devices are disabled. Exclusion zones may be temporary, such as a board room during a board meeting, or may be permanent. For example, a lab within the controlled area 110 may be a permanent exclusion zone. In this case, any device entering such a lab area must be a compliant device with a device administrator module 130 that allows for functionality on the device, such as recording functionality, to be disabled.

In the embodiment of FIG. 1, exclusion zone 150 is shown, and devices 122, 124 and 126 are within such exclusion zone. The recording functionality of devices 122, 124 and 126 is thus disabled in the embodiment of FIG. 1.

Conversely, devices 120 and 128 are outside of exclusion zone 150 and functionality of these devices has not been disabled.

In some cases, functionality may be granularly disabled. Thus in the embodiment of FIG. 1, device 120 is outside of the controlled area 110 and may have no device restrictions. Device 128 is within controlled area 110 but outside of exclusion zone 150, and thus may have some functionality disabled. Devices 122, 124 and 126 are within exclusion zone 150 and therefore may have further features than device 128 disabled. In some cases, further levels of exclusion zones may exist.

Figure 2:
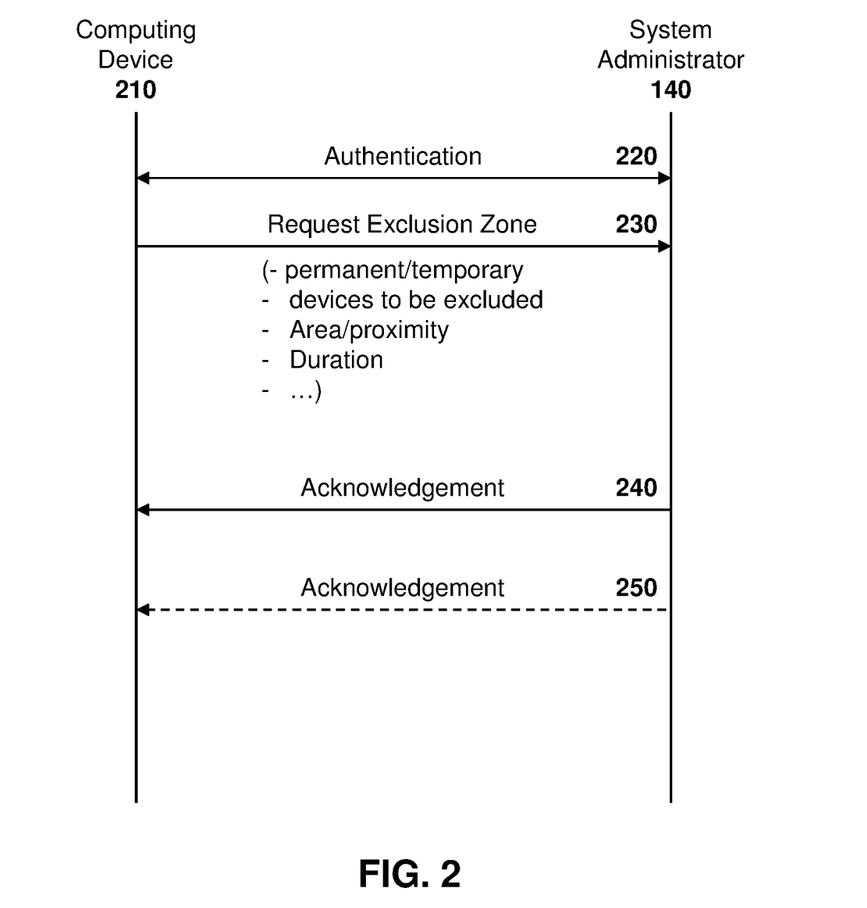
FIG. 2 is a data flow diagram showing establishment of an exclusion zone.

In order to implement the system shown in FIG. 1, various signaling is needed. Reference is now made to FIG. 2. In the embodiment of FIG. 2, a computing device 210 communicates with a system administrator 140. The computing device 210 may be the mobile device or user device of a meeting organizer, for example any of user devices 120-128. Alternatively, computing device 210 may be a desktop computer utilizing a web interface to communicate with system administrator 140. Other options are possible.

In the embodiment of FIG. 2, computing device 210 authenticates with the system administrator 140, as shown through authentication 220. Such authentication may be automatic. For example, if computing device includes a device administrator module 130, this module may contain credentials and software for the automatic authentication of the computing device 210 with system administrator module 140. In other embodiments, credentials may need to be entered. For example, if the administrator module 140 is accessed through a web interface, a username and password may be needed. Other options for authentication are possible.

The computing device 210 may then send a request to establish an exclusion zone to system administrator 140, as shown by message 230. Message 230 may include various information. Such information may include, but is not limited to, an indication of whether the exclusion zone is permanent or temporary. Thus, the computing device 210 may be establishing various permanent exclusion zones including labs. Conversely, the request may be used to establish temporary exclusion zones around meetings during those meeting times.

The exclusion request in message 230 may further include information about devices or features on devices that are to be excluded. For example, in certain meetings, photos may be acceptable but audio may not be acceptable. In this case, the message 230 may indicate that the microphone functionality on devices within the exclusion zone is to be disabled, but allow for camera functionality. In a further embodiment, a lab exclusion zone may allow audio functionality to allow workers to use a device as a telephone, but may restrict camera functionality to prevent pictures of prototypes. In other cases, both microphone and camera functionality may be disabled. In further embodiments, other features or combination of features may be disabled, and the present disclosure is not limited to any specific features or combination of features.

The request of message 230 may further include the area to be covered for the exclusion zone. For example, the area may include certain physical areas such as a lab or a meeting room.

Along with the area, in some cases the proximity around the area to be covered may be specified in message 230. For example, the exclusion may not only be for the meeting room, but within 15 feet of the meeting room to prevent recording of the meeting from areas proximate to such meeting room.

The request of message 230 may further include a timespan or duration for the establishment of the exclusion zone. Thus, message 230 may indicate that the exclusion zone is to be valid for an hour. In other cases, the request may indicate that the exclusion zone is to be valid between 3 pm and 4 pm on a specific date. In other embodiments, message 230 may indicate that the exclusion zone is to be created at 10 am on a specific day, and that it is to be maintained until a cancelation message from a user device or computing device is received. Other examples are possible.

In various embodiments, message 230 may contain a combination of the above information, and may contain other information not provided above. The present disclosure is not limited to any particular information within the request for the creation of the exclusion zone.

The system administrator 140 receives message 230 and processes the message. If the system administrator 140 is able to create the exclusion zone, then system administrator 140 may send an acknowledgement 240 back to computing device 210. In one embodiment, if the exclusion zone was to be immediately created, the acknowledgement 240 may provide an indication to computing device 210 that all devices around the exclusion zone have been secured.

In other embodiments, if the exclusion zone is to be created at a future time or date, then a second security acknowledgement 250 may optionally be sent at the time of the start of the meeting in order to indicate to computing device 210 (or to another user device) that all devices around the exclusion zone have been secured.

Figure 3:
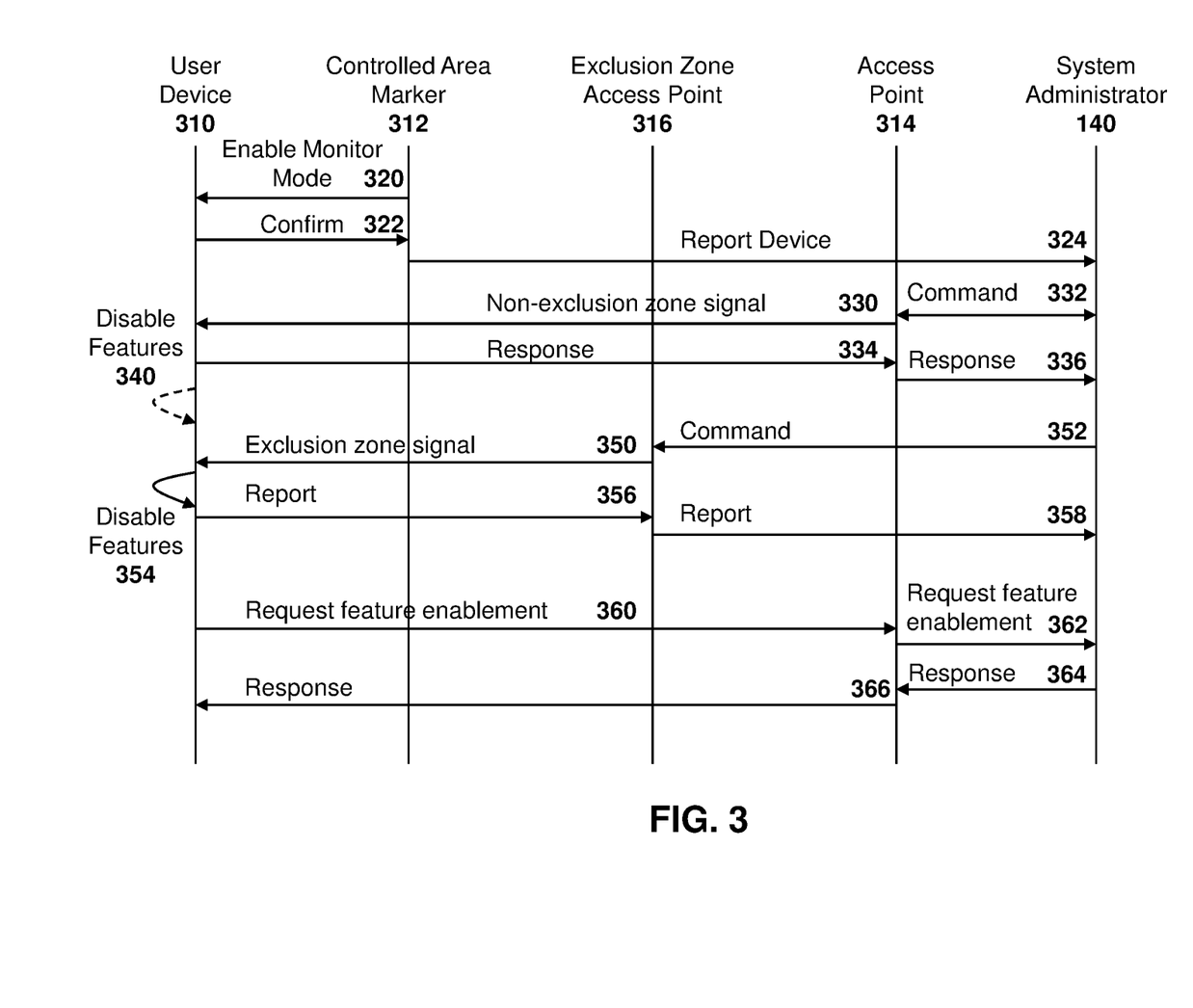
FIG. 3 is a data flow diagram showing communications between elements of the system to disable features on a computing device.

Reference is now made to FIG. 3, which shows a signaling diagram between a controlled user device 310 and various elements within the system.

In particular, a device 310 communicates with a controlled area marker 312. Such controlled area marker, for example, corresponds with marker 114 from FIG. 1. When a device 310 enters the controlled area, controlled area marker 312 broadcasts a message 320 which is received by device 310. Message 320 instructs devices that receive it to enter into a monitoring mode. Message 320 may further include optional information, including the type or frequency band of signals to monitor. For example, message 320 may indicate that the device should monitor both Bluetooth™ and WiFi signals, and may provide pairing information for Bluetooth sources or WiFi access points. In other embodiments, message 320 may include monitoring information for particular signals from any short range or wide area communication signal.

Device 310, and in particular, a device administrator module on the device 310, causes the device to enter into monitoring mode. In the monitoring mode, device 310 may activate sensors that are configured to detect specific signals within the controlled area. The device may further enable network connections for periodic reporting and receipt of configuration information.

In one embodiment, the device administrator module further disables features on device 310 on receiving message 320. For example, message 320 may include the features to be disabled on the device in one embodiment. In other embodiments, the entering into a controlled area may cause a default set of features to be disabled. As described below, such features may continue to be disabled until a non-exclusion zone signal is received without receipt of any exclusion zone signal.

The device may further include triggers for an enforcement module on the device. Once an exclusion zone signal is detected on the device, the triggers may cause the enforcement module to limit the functionality of the device. The triggers may further cause a report to the system administrator 140 indicating that the device is now an enforcement mode.

The device administrator module on device 310, including detection and enforcement modes, run as a device administrator at the operating system level, ensuring that the device complies with any system administrator provided configuration and that user input or applications on the device 310 are not able to override such system administrator configurations.

A device 310 that receives a monitoring mode signal 320 may provide a confirmation 322 either back to controlled area marker 312 or to system administrator 140 directly (not shown). If the signal 322 goes through controlled area marker 312 then the controlled area marker 312 may report the device, as shown by message 324, to system administrator 140.

Thus, referring again to FIG. 1, devices 122 to 128 are within the controlled area 110 and thus have received the controlled area marker signal 320 and has acknowledged it with message 322, and have therefore entered monitoring mode.

Conversely, device 120 is outside of controlled area 110 and therefore may not be in monitoring mode, which may save battery life of device 120 in some situations.

By receiving message 324, system administrator 140 knows which devices are within the controlled area 110. In one embodiment, control area marker 312 may be a Wi-Fi signal at an entrance to the building. However, in other embodiments, any access point may be used, including Wi-Fi, Bluetooth, an Infrared Device Association (IrDA) signal, a near field communication signal (NFC), among other options. For example, the device may use an NFC reader to engage an NFC terminal on entrance and exit from a building.

A guard at a security desk at the entrance or egress to the controlled area 110 may look for a physical indication on device 310 that the device has entered into the monitoring mode. For example, a user interface on device 310 may provide an indication that monitoring mode has been entered. In other embodiments, an LED or other signal on the device may turn a specific color, flash in a certain combination, among other options, in order to signal to security that the device is compliant.

In other embodiments the device may use NFC or other short range communications to gain access to and to leave a controlled area. The NFC authentication response may include information that the device is a compliant device (either through the response message or identification of the device).

Other options for ensuring a device is compliant and in monitoring mode are possible.

Within a controlled area 110, in accordance with the embodiments of the present disclosure, exclusion zone and non-exclusion zone signals may be broadcast and may be received by user device 310. Depending on where the device 310 is within the controlled area 110, it may receive one or more of the exclusion zone and/or non-exclusion zone signals.

Various access points, controllable by system administrator 140, may broadcast exclusion zone or non-exclusion zone signals. The access points for sending such signals could be any access point, including Wi-Fi, Bluetooth, pico cells, femto cells, among other options.

In accordance with the embodiment of FIG. 3, an access point 314 is within controlled area 110 and provides a non-exclusion zone signal to devices within range of the access point. The non-exclusion zone signal is shown in the embodiment of FIG. 3 as a signal 330, which may be any broadcast signal and may have various security associated therewith. For example, the signal may include time varying bits which may be verifiable as being incapable of being replayed at the user device 310 and by a system administrator 140. Further, in some cases the signal 330 may include a signed hash of previous bits using the public key of the transmitting zone marker, which is also known to system administrator 140. Other options are possible.

In one embodiment, signal 330 may change in time in a manner predicable by only the system administrators. For example, the signal may include a one way has, known only to the system administrator, mapping the signal to an access point X, such that (X, t, exclusion_zone_n)→S2_X, where t is a time and S2_X is the signal 330 sent by transmitter X. The mapping is valid for all access points X in the system.

In this example, each access point X is sent the schedule of signals to transmit periodically, or is made aware of a subset of mapping (t, exclusion_zone_n) to derive S2_X.

When a report comes in from a device to the administrator module, it will be able to assert that the signal 330 that was reported was current in time. This timeliness property allows the system to allow and disallow input in a timely manner. The location specificity provides a less definitive property to admin to correlate the signal 330 receipt reports from different devices, where devices that see exactly the same non-exclusion zone signals but see different exclusion zone signals may be disallowed.

Signal 330 may be sent by access point 314 upon receiving a command 332 from system administrator 140 in one embodiment. In other embodiments, access point 314 may be configured by system administrator 140 to periodically and autonomously transmit the non-exclusion zone signal 330.

The user device 310 receives signal 330 and provides a response 334. In one embodiment, response 334 may be provided back through access point 314, which may forward the response to the system administrator 140, shown by message 336. In other embodiments, the response may be sent through other access points, including a cellular connection to system administrator 140.

Signal 330 may be periodic, where the period is set by system administrator 140. Such period may be set to ensure that the monitoring is infrequent enough to avoid battery drain but frequent enough to avoid circumvention.

If, as provided above, features on the device have been disabled upon entering the controlled area, receipt of signal 330 without simultaneous receipt of an exclusion zone signal may allow user device 310 to enable features.

A detection module, which may be part of the device administration module, on device 310 may be aware of the period of the signals 330. If the device 310 does not receive a signal within a certain duration of time, then the device at 310 may disable recording features, shown by arrow 340. This may be done, for example, to ensure that a user does not block reception of access point signals, for example by turning off radios, putting the device into a Faraday cage, among other options.

Assuming user device 310 continues to receive signals, a user device 310 may move into range of an access point transmitting exclusion zone signals. Such access point is referred to herein as an exclusion zone access point 316. Exclusion zone access point 316 transmits a signal 350 indicating that certain device features are to be disabled.

Signal 350 may include, for example, zone identifier bits which may uniquely identify the zone and are sent by the system administrator 140 to exclusion zone access point 316, for example in command 352, and further to devices detected as entering the exclusion zone.

A signal 350 may further include time varying bits and/or a signed hash of previous bits using the public key of the exclusion zone access point 316 in order to ensure that the signal is not replayed and is being sent by reliable source.

In some embodiments, the exclusion zone access point 316 may be a fixed location access point, such as for example within a lab of the facility or near a particular meeting point.

In other cases, the access point may be a specific computing device or mobile device that can temporarily broadcast a signal. In this case it may be referred to as a marker rather than an access point. For example, a presenter's mobile device may transmit a Bluetooth Low Energy (LE) message containing preconfigured sections of signal bits from the Universally Unique Identifier (UUID) major and minor ID fields, among other options.

Once device 310 receives message 350, the device 310 disables one or more features, as shown by arrow 354. Such one or more features may include default features configured or preconfigured on the device, or the features may be specified in message 350. For example, the signal may indicate to the device that the camera and microphone must be disabled. In other embodiments only the camera or only the microphone may need to be disabled. In still further embodiments other features on the device may be disabled.

In a further embodiment, a list of one or more features that are to be disabled in exclusion zones within controlled area 110 may be configured and stored during entrance into the control area. For example, such list of features may be part of message 320. In this case, if message 350 has no features enumerated, receipt of the message would cause the features configured during entrance to the controlled area 110 to be disabled.

Receipt of signal 350 at device 310 triggers an enforcement module on the device. The enforcement module runs at a higher privilege level than the user and other applications to ensure that the enforcement module cannot be circumvented. The enforcement module disables features on the device.

The enforcement module may indicate to the user that features or inputs are prohibited by the system administrator. For example, a pop up on the user interface of device 310 may indicate that the device has entered an exclusion zone and that microphone and camera settings are disabled. The pop up, in one embodiment, may provide proposed mitigation. For example, the pop up may indicate that if the user wishes to use the microphone on the device, the user should move to the third floor of the building.

Device 310 further reports the disabling of the features to system administrator 140. In the example of FIG. 3 the reporting is done through exclusion zone access point 316, shown by message 356, which forwards the message to system administrator 140, shown by message 358. In other embodiments message 358 can be sent to system administrator 140 through other access points.

An enforcement module on device 310 continues to disable the features on the device until the signal 350 is no longer detected. This may occur, for example, if the device 310 moves out of range of the exclusion zone access point. In may also occur if the meeting has ended and the access point has stopped transmitting signal 350.

Once the signal 350 is no longer received, either by being turned off or the device moving out of range, the device 310 may signal to the system administrator 140 that it no longer sees the exclusion zone signal and may request the enabling of the disabled features. Such request is shown as messages 360 and 362 in FIG. 3.

The system administrator 140 may then send a message 364 back to device 310 indicated whether the enabling of features is permitted. For example, in some cases features are not to be enabled when the device is not far enough from the exclusion zone. In other cases, message 360 allows the system administrator 140 to acknowledge that the device 310 is permitted to enable such features.

Message 364 passes through access point 314 in the embodiment of FIG. 3, and is forwarded to device 310 as message 366.

The enablement of features may further trigger a signal to a user. For example, a pop up on the user interface of the device may indicate that that the user has exited the exclusion zone and that certain features are now enabled.

While the embodiments above describe message 350 as a broadcast message by an exclusion zone access point, in other embodiments message 350 may be specific to an individual user. For example, in some cases when a user has entered a lab in the controlled area 110 then a targeted message to the user may be made.

For example, a user who swipes an access card to enter the lab may trigger such message. The swipe of the card may send a signal to system administrator 140, which may then cause the device 310 to be signaled, through any access point, that features on the device are to be disabled. In this case, the features may be disabled until the device 310 sees an access point that is outside of the range of the laboratory, for example.

The above embodiments may further be expanded to allow for virtual meetings. Specifically, a virtual meeting is one in which at least one participant is located in a different location from the presenter. In this case, virtual meetings may be allowed if the remote device is a compliant device. Further, the compliant device administrator may ascertain if the device is in a secure location such as within controlled building, before allowing connection to the meeting.

In this case, if the device is in a controlled location then the system administrator 140 may set a periphery around such a device as being a further exclusion zone and may secure devices within that exclusion zone to prevent recording.

In further embodiments, a multi-device security zone may be provided. Thus instead of only a presenter's device providing the exclusion zone signal, any device within a one hop radius of the presenter's device can also establish a security zone. In this case, a device other than the presenter's device receives the exclusion zone signal and is told to broadcast its own exclusion zone signal. Therefore, any devices that can see the secondary exclusion zone signals are also considered within the exclusion zone and features on these devices are also disabled.

In a further alternative embodiment, instead of disabling features, a watermark may be added to any recording to determine the source of the recording. In this case, a log of the event and a watermark may be reported to system administrator 140. Thereafter, if the leak of information from the meeting is made, the watermark stored by system administrator 140 may be cross-referenced with the leak to determine the source of the leak.

The modules and devices, including the administrator module and computing devices, described above may be any computing device or network node. One simplified diagram of a computing device is shown with regard to FIG. 4.

Figure 4:
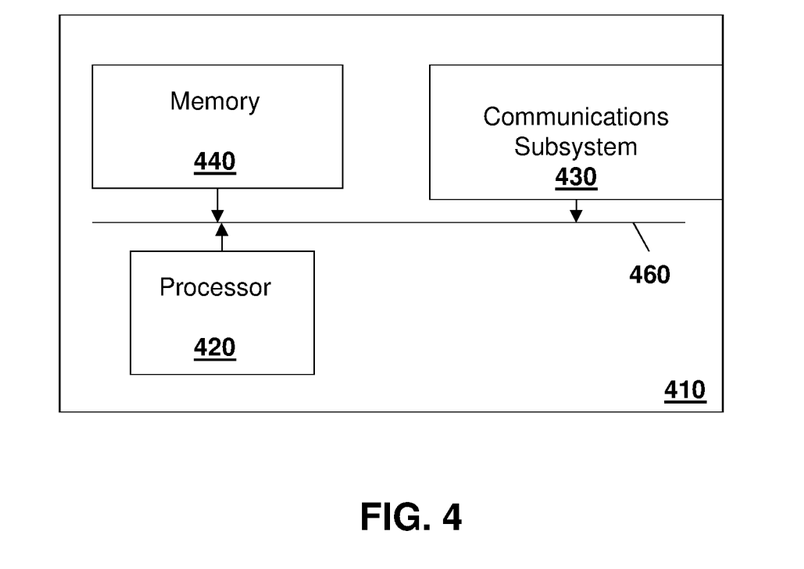
FIG. 4 is a block diagram of a simplified electronic device capable of being used with the methods and systems herein according to one embodiment.

In FIG. 4, device 410 includes a processor 420 and a communications subsystem 430, where the processor 420 and communications subsystem 430 cooperate to perform the methods of the embodiments described above.

Processor 420 is configured to execute programmable logic, which may be stored, along with data, on device 410, and shown in the example of FIG. 4 as memory 440. Memory 440 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 440, device 410 may access data or programmable logic from an external storage medium, for example through communications subsystem 430.

Communications subsystem 430 allows device 410 to communicate with other devices or network elements.

Communications between the various elements of device 410 may be through an internal bus 460 in one embodiment. However, other forms of communication are possible.

Further, if any of computing devices 120, 122, 124, 126, 128 or 310 are mobile devices, one example device is described below with regard to FIG. 5.

Mobile device 500 may comprise a two-way wireless communication device having voice or data communication capabilities or both. Mobile device 500 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 500 is enabled for two-way communication, it may incorporate a communication subsystem 511, including a receiver 512 and a transmitter 514, as well as associated components such as one or more antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate.

Network access requirements will also vary depending upon the type of network 519. In some networks network access is associated with a subscriber or user of mobile device 500. A mobile device may require a removable user identity module (RUIM) or a subscriber identity module (SIM) card in order to operate on a network. The SIM/RUIM interface 544 is normally similar to a card-slot into which a SIM/RUIM card can be inserted and ejected. The SIM/RUIM card can have memory and hold many key configurations 551, and other information 553 such as identification, and subscriber related information. Without a SIM card, the mobile device may still be capable of limited functionality, including placing an emergency call.

When required network registration or activation procedures have been completed, mobile device 500 may send and receive communication signals over the network 519. As illustrated in FIG. 5, network 519 can include multiple base stations communicating with the mobile device.

Signals received by antenna 516 through communication network 519 are input to receiver 512, which may perform such common receiver functions as signal amplification, frequency down conversion, filtering, channel selection and the like. Analog to digital (A/D) conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog (D/A) conversion, frequency up conversion, filtering, amplification and transmission over the communication network 519 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile device 500 generally includes a processor 538 which controls the overall operation of the device. Communication functions, including data and voice communications, are performed through communication subsystem 511. Processor 538 also interacts with further device subsystems such as the display 522, flash memory 524, random access memory (RAM) 526, auxiliary input/output (I/O) subsystems 528, serial port 530, one or more keyboards or keypads 532, speaker 534, microphone 536, other communication subsystem 540 such as a short-range communications subsystem and any other device subsystems generally designated as 542. Serial port 530 could include a USB port or other port known to those in the art.

Figure 5:
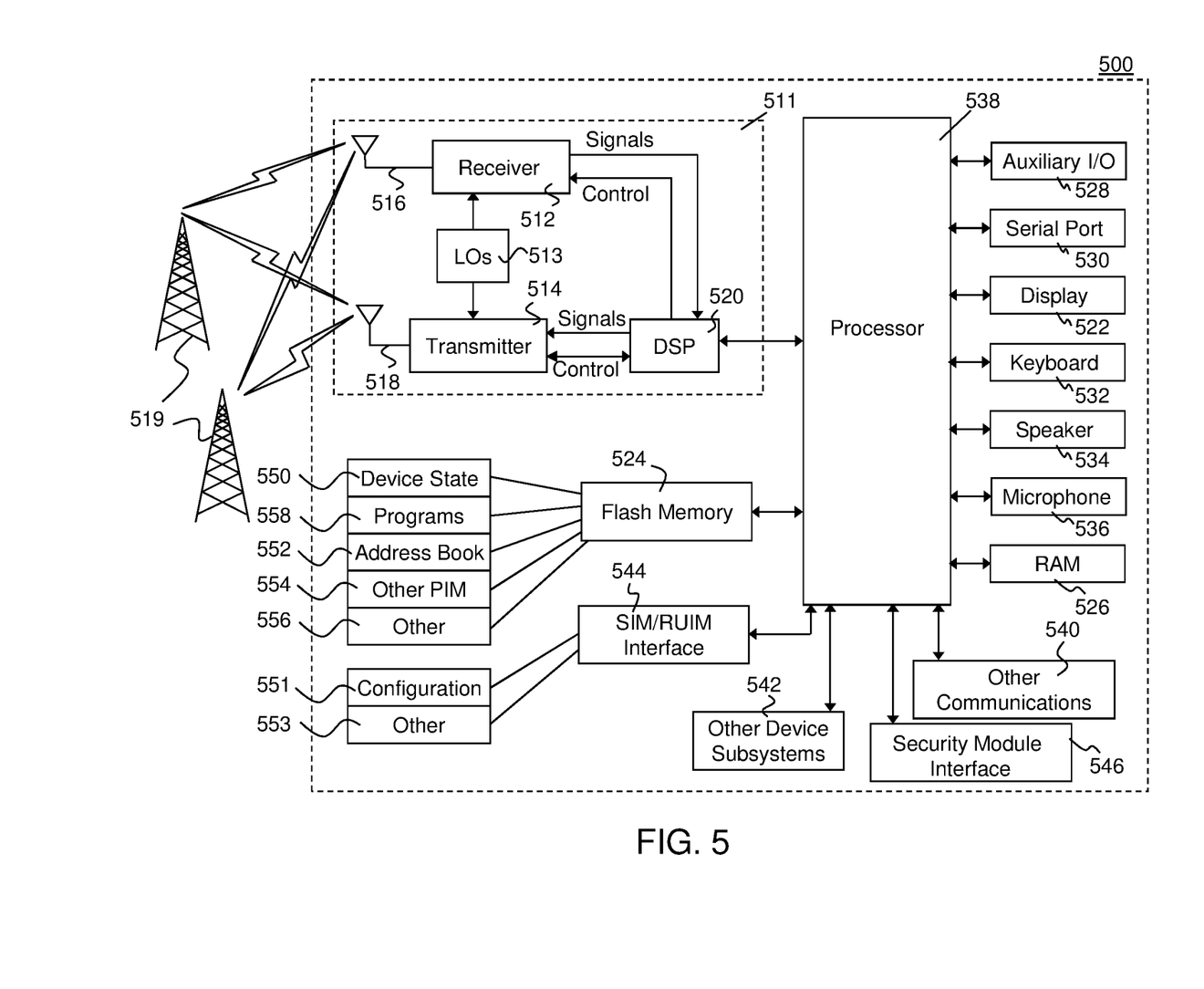
FIG. 5 is a block diagram of a mobile device according to one embodiment.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the processor 538 may be stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Processor 538, in addition to its operating system functions, may enable execution of software applications on the mobile device. A predetermined set of applications that control basic operations, including at least data and voice communication applications for example, will normally be installed on mobile device 500 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including productivity applications, social media applications, games, among others, may also be loaded onto the mobile device 500 through the network 519, an auxiliary I/O subsystem 528, serial port 530, short-range communications subsystem 540 or any other suitable subsystem 542, and installed by a user in the RAM 526 or a non-volatile store (not shown) for execution by the processor 538. Such flexibility in application installation increases the functionality of the device and may provide enhanced on-device functions, communication-related functions, or both. A further software application with higher privilege level includes a device administrator module as described above.

In a data communication mode, a received signal such as a text message or web page download will be processed by the communication subsystem 511 and input to the processor 538, which may further process the received signal for output to the display 522, or alternatively to an auxiliary I/O device 528.

A user of mobile device 500 may also compose data items such as messages for example, using the keyboard 532, which may be a complete alphanumeric keyboard or telephone-type keypad, either physical or virtual, among others, in conjunction with the display 522 and possibly an auxiliary I/O device 528. Such composed items may then be transmitted over a communication network through the communication subsystem 511.

Where voice communications are provided, overall operation of mobile device 500 is similar, except that received signals may typically be output to a speaker 534 and signals for transmission may be generated by a microphone 536. Alternative voice or audio I/O subsystems, such as a voice message recording subsystem, may also be implemented on mobile device 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5 may be implemented in a mobile device for which synchronization with a user's desktop computer (not shown) may be desirable, but is an optional device component. Such a port 530 may enable a user to set preferences through an external device or software application and may extend the capabilities of mobile device 500 by providing for information or software downloads to mobile device 500 other than through a wireless communication network. As will be appreciated by those skilled in the art, serial port 530 can further be used to connect the mobile device to a computer to act as a modem or for charging a battery on the mobile device.

Other communications subsystems 540, such as a short-range communications subsystem, is a further optional component which may provide for communication between mobile device 500 and different systems or devices, which need not necessarily be similar devices. For example, the subsystem 540 may include an infrared device and associated circuits and components or a Bluetooth™ communication module to provide for communication with similarly enabled systems and devices. Subsystem 540 may further include non-cellular communications such as WiFi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for disabling one or more features at a computing device, the method comprising:
    receiving, at the computing device, a first signal, the first signal directing the computing device to listen for a second signal, the second signal indicating whether the computing device can operate normally or indicating one or more features to be disabled;
    providing, on a user interface of the computing device, an indication that monitoring mode has been entered;
    detecting the second signal;
    reporting to a system administrator receipt of the second signal;
    when the second signal indicates the one or more features to be disabled:
        immediately and automatically disabling the one or more features on the computing device;
    when the second signal indicates the computing device can operate normally:
        enabling the one or more features on the computing device.

2. The method of claim 1, wherein the first signal is received on entry of the computing device into a controlled area.

3. The method of claim 2, wherein the first signal is received through at least one of a near field communications signal; a Bluetooth signal; or a WiFi Signal.

4. The method of claim 1, further comprising:
    disabling one or more features on the computing device when no second signal is detected by the computing device for a defined period of time.

5. The method of claim 1, wherein the disabling is performed by a module on the computing device having higher privilege level that user applications on the computing device.

6. The method of claim 1, wherein the second signal is timely, non-repudiable and non-replayable.

7. The method of claim 6, wherein the second signal includes bits to uniquely identify an exclusion zone.

8. The method of claim 1, further comprising, upon detecting the second signal:
    checking whether the second signal contains a retransmission requirement; and
    if the second signal contains a retransmission requirement, broadcasting the second signal from the computing device.

9. The method of claim 1, further comprising:
    no longer detecting the second signal indicating the one or more features to be disabled; and
    requesting, from the system administrator, permission to enable the one or more disabled features.

10. A computing device configured for disabling one or more features, the computing device comprising:
    a processor; and
    a communications subsystem,
    wherein the computing device is configured to:
        receive a first signal, the first signal directing the computing device to listen for a second signal, the second signal indicating whether the computing device can operate normally or indicating one or more features to be disabled;

provide, on a user interface of the computing device, an indication that monitoring mode has been entered;

detect the second signal;

report to a system administrator receipt of the second signal;

when the second signal indicates the one or more features to be disabled:

immediately and automatically disable the one or more features on the computing device; and when the second signal indicates the computing device can operate normally:

enable the one or more features on the computing device.

11. A non-transitory computer readable medium for storing program code, which, when executed on a processor of a computing device are configured to disable one or more features on the computing device, the program code comprising instructions for:

receiving, at the computing device, a first signal, the first signal directing the computing device to listen for a second signal, the second signal indicating whether the computing device can operate normally or indicating one or more features to be disabled;

providing, on a user interface of the computing device, an indication that monitoring mode has been entered;

detecting the second signal;

reporting to a system administrator receipt of the second signal;

when the second signal indicates the one or more features to be disabled:

immediately and automatically disabling the one or more features on the computing device; and when the second signal indicates the computing device can operate normally:

enabling the one or more features on the computing device.

12. A system for disabling one or more features on at least one computing device, the system comprising:

the at least one computing device, each computing device having a device administrator module thereon;

a controlled area with a plurality of access points therein; and a system administrator module communicating with the at least one computing device and the plurality of access points, wherein the system is configured to:

receive, at the system administrator module, information about the computing devices entering and exiting the controlled area;

receive, at the system administrator module, a request to establish an exclusion zone within the controlled area, the request comprising one or more features to be disabled by any device within the exclusion zone;

causing, by the system administrator module, an exclusion zone signal to be transmitted from one or more access points or one or more of the computing devices, the exclusion zone signal indicating to computing devices within range of the exclusion zone signal to immediately and automatically disable one or more features on such computing devices, the exclusion zone signal specifying the one or more features;

causing, by the system administrator module, a non-exclusion zone signal to be transmitted by other access points within the controlled area; and verifying, by the system administrator module, that computing devices within the controlled area and near the exclusion zone are secured.

13. The system of claim 12, wherein each computing device of the at least one computing devices reports detection of non-exclusion zone signals and exclusion zone signals to the system administrator module.

14. The system of claim 12, further comprising markers at all entrances to the controlled area, the markers transmitting a signal indicating that the at least one computing device should enter a monitoring mode to monitor for exclusion zone and non-exclusion zone signals.

* * * * *